United States Patent [19]

Silcox

[11] 4,320,721
[45] Mar. 23, 1982

[54] ANIMAL WATERING APPARATUS

[76] Inventor: Wayne E. Silcox, Shepherd, Mont. 59079

[21] Appl. No.: 135,206

[22] Filed: Mar. 28, 1980

[51] Int. Cl.³ .............................................. A01K 7/00
[52] U.S. Cl. ..................................................... 119/73
[58] Field of Search ............................ 119/72, 73, 74; 219/338, 343, 436, 438, 535

[56] References Cited

U.S. PATENT DOCUMENTS

| | | | |
|---|---|---|---|
| 2,729,733 | 1/1956 | Heron | 219/535 |
| 2,945,114 | 7/1960 | Mathews | 219/438 X |
| 3,806,701 | 4/1974 | Scott | 219/436 X |
| 3,816,687 | 6/1974 | Heitner | 219/438 X |
| 3,820,508 | 6/1974 | Robinson | 119/73 |
| 3,852,566 | 12/1974 | Quirk | 219/311 |
| 4,218,607 | 8/1980 | Noland | 119/73 X |

FOREIGN PATENT DOCUMENTS 2355487 1/1978 France ................... 219/438

*Primary Examiner*—Gene Mancene
*Assistant Examiner*—Robert P. Swiatek
*Attorney, Agent, or Firm*—Arthur L. Urban

[57] ABSTRACT

An animal watering apparatus including a sidewall portion and an end portion forming a unitary structure, the sidewall portion including an inner wall section and an outer wall section spaced therefrom, insulating material disposed between the inner wall section and the outer wall section, electrical heating mechanism disposed throughout a major portion of the insulating material between the inner wall section and the outer wall section, and mechanism for connecting the heating mechanism to an electrical power source.

8 Claims, 4 Drawing Figures

ANIMAL WATERING APPARATUS

This invention relates to a novel watering apparatus and more particularly relates to a new apparatus for watering animals.

Through the years, a wide variety of water sources have been utilized for watering animals. In some situations, animals simply are allowed to drink from streams and other natural sources of water. However, where natural surface water sources are not located in the grazing pastures of the animals, other sources are required. For example, water may be transferred to the pasture from nearby streams, lakes, ponds, etc. through ditches or pipes. If such watering sources are not available, it may be necessary to provide the animals with water from wells or the like.

Whether the water is transferred from nearby sources or drawn from wells, it still is necessary to provide a storage facility to retain the water at its desired location. Such facilities may take the form of troughs, tanks and the like. Present day stock watering containers often are galvanized metal tanks that are round or oval in shape.

One of the problems with tanks and similar water storage facilities is that the water often freezes in cold weather. The possibility of freezing can be reduced if the water is allowed to flow through the tank continuously. However, this practice wastes water and the water still may freeze if the weather should become extremely cold for a considerable length of time.

In an attempt to eliminate the freezing problem, some indivduals employ tank heaters. Such heaters ordinarily are of two types. One is a heater that is fastened to the sidewall of the tank below the water level. The other is a heater that is placed in the water and floats on the surface. Although such heaters function satisfactorily in ordinary cold weather, if the weather becomes extremely cold, the water in the tank may freeze except for the portion closely adjacent to the heater. In such cases, the quantity of water available to the animals may be restricted.

Both in the case of the running water supply and in the case of the tank heater, if the weather is extremely cold, the persons looking after the stock must spend considerable time and effort maintaining an adequate supply of water in the tank. This requires that the water tank be inspected frequently so that any ice accumulation can be removed promptly. Unfortunately, this inspection may have to be done when the weather conditions are especially inclement, making the task particularly unpleasant.

Also, there are other types of animal watering devices that do not lend themselves to either of the above solutions. For example, waterers are used for watering a few small animals such as poultry. While frequent replenishing of the water in such situations is less of a burden, the water may freeze more quickly because of the small quantities involved.

A further complication in maintaining a water supply for animals is arranging one's schedule to provide time for checking and replenishing the water. There may be times when the changing of the water is not possible because of other responsibilities or chores. On other occasions even though free time is allowed, the person may become engrossed in some other task and forget to check the water supply. Then, the water will freeze and the animals will be without a supply of water for their thirst.

From the above discussion, it is clear that none of the presently used methods for providing a water supply for animals is satisfactory under the wide variety of the conditions that are frequently encountered. Thus, there is a need for a new device that can operate satisfactorily under extremes of weather and other adverse conditions.

The present invention provides a novel animal watering apparatus which can provide animals with water even under extremely cold weather conditions. The animal watering apparatus of the invention provides a large quantity of water free of ice so that much less time and attention are required for inspecting the waterer and adding water when necessary. Thus, the apparatus can be inspected when there are breaks in the weather.

The animal waterer of the invention is simple in design and relatively inexpensive to manufacture. The apparatus can be fabricated from commercially available materials utilizing conventional fabricating techniques and with semi-skilled labor.

Other benefits and advantages of the novel animal watering apparatus of the present invention will be apparent from the following description and the accompanying drawings in which.

Figure 1:
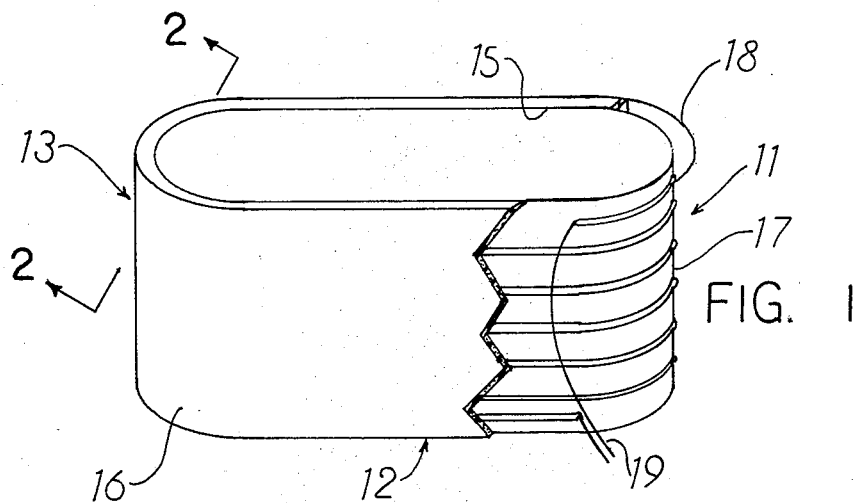
FIG. 1 is a view in perspective partially in section of one form of the animal watering apparatus of the invention.
Figure 2:
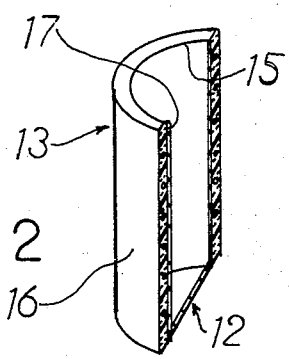
FIG. 2 is a sectional view of the watering apparatus shown in FIG. 1 taken along line 2—2 of FIG. 1.

As shown in FIGS. 1 and 2 of the drawings, an animal watering apparatus 11 of the invention includes a bottom or end portion 12 and a sidewall portion 13. The bottom portion 12 and the sidewall portion 13 form a unitary structure which provides storage for the desired quantity of water. The bottom portion 12 advantageously is substantially flat to facilitate placement of the apparatus.

The sidewall portion 13 includes an inner wall section 15 and an outer wall section 16 spaced therefrom. An insulating material 17 is disposed between the inner wall section 15 and the outer wall section 16. The insulating material 17 advantageously may be a conventional insulating material such as fiberglass.

Electrical heating means is disposed between the inner wall section 15 and the outer wall section 16. The heating means is distributed throughout a major portion of the insulating material. Advantageously, the heating means comprises a plurality of heating elements 18 such as electrical resistance wiring, calrod heating elements and the like. Lead wires 19 connect the heater to a suitable power source such as a battery or electrical circuit (not shown).

Figure 3:
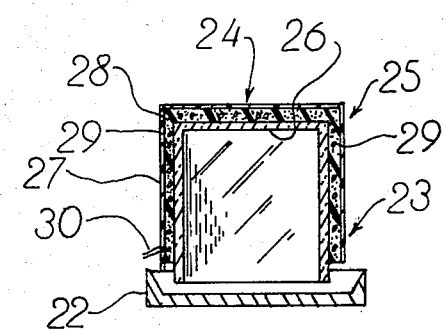
FIG. 3 is a side view in section of another form of the animal watering apparatus of the invention.

FIG. 3 illustrates another watering apparatus of the invention including a tray portion 22 above which is suspended an inverted water chamber 23. The water chamber 23 includes an end portion 24 and a sidewall portion 25. The sidewall portion 25 includes an inner wall section 26 and an outer wall section 27. An insulating material 28 such as a plastic foam, e.g. a polystyrene, polyurethane or other foam insulation is disposed between the inner wall section 26 and the outer wall section 27. Electrical heating means shown as electrical resistance wiring 29 is disposed within the insulating material. Leads 30 connect the heater to a power source.

Figure 4:
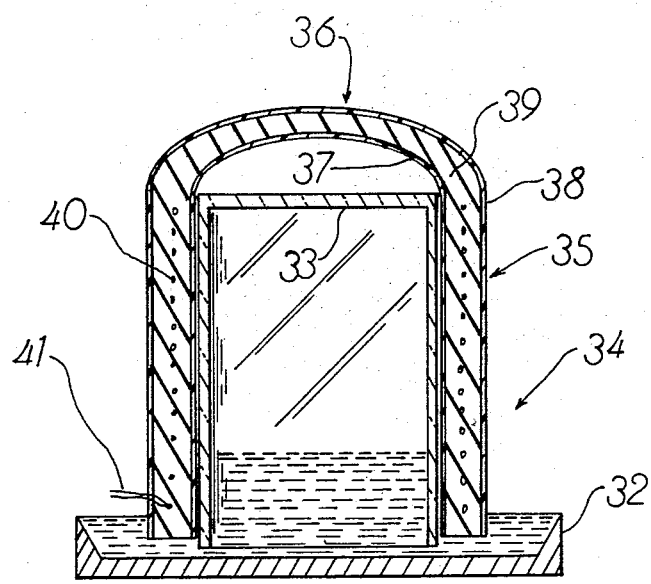
FIG. 4 is a side view in section of a further form of the animal watering apparatus of the invention.

In FIG. 4 is shown a watering apparatus similar to that shown in FIG. 3. The apparatus of FIG. 4 includes a tray portion 32 and an inverted water chamber 33. Surrounding the water chamber 33 is a removable member 34 including a sidewall portion 35 and an end portion 36. Sidewall portion 35 includes an inner wall section 37 and an outer wall section 38. Insulating material 39 is disposed between the inner wall section 37 and the outer wall section 38. Disposed within the insulating material 39 is heating means shown as electrical heating wiring 40. Electrical lead wires 41 extend from the apparatus for attachment to a suitable electrical power source such as a battery or an electrical circuit (not shown).

The animal watering apparatus of the present invention may be fabricated in a variety of shapes and configurations, e.g., circular, oval, oblong and the like. The apparatus may be fabricated from different structural materials such as metal, plastic, and the like. The plastic materials may include fiberglass reinforced sections. Fabrication of the apparatus of plastic materials enables the sidewall portion and the end or bottom portion to be molded as an integral structure without seams.

The above description and the accompanying drawings show that the present invention provides a novel animal watering apparatus that is capable of supplying water under cold weather conditions. The apparatus of the invention maintains a substantial quantity of water free of ice even under severe weather conditions. As a result, inspection and filling of the apparatus of the invention is required less frequently.

The waterer of the invention is simple to use after only a minimum of instruction. The apparatus of the invention requires very little maintenance and has a long life.

The animal watering apparatus of the invention is simple in design and can be manufactured relatively inexpensively. The apparatus can be fabricated from commercially available materials employing commercial fabricating techniques and semi-skilled labor.

It will be apparent that various modifications can be made in the particular watering apparatus described in detail and shown in the drawings within the scope of the invention. For example, the size and configuration of the apparatus can be different to meet specific requirements. Also, the location of the heating means can be changed provided the operation of the apparatus is not adversely affected. In addition, the insulating material can be located differently as desired. Further, the thickness of the insulating material can be varied for particular marketing areas with different climatic conditions. Therefore, the scope of the invention is to be limited only by the following claims.

What is claimed is:

1. An animal watering apparatus including a substantially vertical sidewall portion and a substantially flat end portion forming an open-ended unitary structure, said sidewall portion including an inner wall section and an outer wall section spaced therefrom and substantially parallel thereto, electrical heating means disposed between said inner wall section and said outer wall section, said electrical heating means including spaced electrical resistance wiring disposed around the perimeter of said inner wall section and in direct contact therewith along substantially its entire length, insulating material extending from the outwardly facing portions of said wiring and the portions of said inner wall section between said wiring to said outer wall section, said electrical wiring and said insulating material being confined to said sidewall portion, and means for connecting said heating means to an electrical power source.

2. An animal watering apparatus according to claim 1 wherein said inner wall section is metal.

3. An animal watering apparatus according to claim 1 wherein said inner wall section is plastic.

4. An animal watering apparatus according to claim 1 wherein said insulating material is fiberglass.

5. An animal watering apparatus according to claim 1 wherein said insulating material is a foam.

6. An animal watering apparatus according to claim 1 wherein said sidewall portion and said end portion are an integral structure.

7. An animal watering apparatus according to claim 1 wherein said sidewall portion is separable from a water holding portion.

8. An animal watering apparatus according to claim 1 wherein said sidewall portion includes a continuous wall section around the perimeter of said apparatus.

* * * * *